United States Patent [19]

Lee

[11] Patent Number: 5,047,254

[45] Date of Patent: Sep. 10, 1991

[54] PROCESS FOR THE RECOVERY OF EDIBLE OIL FROM CEREAL PRODUCTS

[76] Inventor: Tung-Ching Lee, 26 Higgins Dr., Kingston, R.I.

[21] Appl. No.: 841,009

[22] Filed: Mar. 14, 1986

Related U.S. Application Data

[63] Continuation of Ser. No. 302,344, Sep. 15, 1981, abandoned, which is a continuation of Ser. No. 97,602, Nov. 26, 1979, abandoned.

[51] Int. Cl.[5] .......... G11B 1/04

[52] U.S. Cl. .......... 426/417; 260/417.4; 426/454; 426/448; 426/449

[58] Field of Search .......... 426/417, 454, 448, 449; 260/412.4

[56] References Cited

U.S. PATENT DOCUMENTS

| | | | |
|---|---|---|---|
| 2,448,729 | 9/1948 | Ozai-Durrani | 426/417 X |
| 2,563,798 | 8/1951 | Burns et al. | 426/463 |
| 2,727,914 | 12/1955 | Gastrock et al. | 260/412.4 |
| 3,255,220 | 6/1966 | Baer et al. | 260/412.2 |
| 3,579,352 | 5/1971 | Bookwalter et al. | 426/448 X |
| 3,650,763 | 3/1972 | Touba | 426/448 X |
| 3,653,916 | 4/1972 | Straughnet et al. | 426/448 X |
| 3,851,081 | 11/1974 | Epstein | 426/448 X |
| 3,958,027 | 5/1976 | Alexander et al. | 426/417 X |

OTHER PUBLICATIONS

Mottern et al., Cooking-Extrusion-Expansion of Rice, *Food Technology,* 1969, vol. 23, No. 4, pp. 169-171.

*Primary Examiner*—Joseph Golian
*Attorney, Agent, or Firm*—Ladas & Parry

[57] ABSTRACT

The oil content of rice bran can be stabilized by simultaneous high temperature high pressure treatment. Such a treatment also improves the yield obtainable when such oil is extracted from rice bran by solvent extraction.

8 Claims, No Drawings

PROCESS FOR THE RECOVERY OF EDIBLE OIL FROM CEREAL PRODUCTS

This is a continuation of application Ser. No. 302,344, filed on Sept. 15, 1981, now abandoned, which is in turn a continuation of application Ser. No. 097,602, filed on Nov. 26, 1979, now abandoned.

The present invention relates to the extraction of oil from cereal brans and has particular application to the extraction of oil from rice bran.

Rice for human consumption is milled and polished to remove the outer layers from the paddy (i.e. rice kernals obtained by threshing). Bran is the by-product of milling and consists of the outer bran layers of the kernal (principally the pericarp and tegumen) and part of the germ. Depending upon the milling technique employed it may also be mixed with part of the hull. Typically bran constitutes from 5-9% by weight of the milled paddy. Most rice bran is at present used as animal feed, fertilizer or fuel.

D. F. Houston in "Rice: Chemistry and Technology" published by the American Association of Cereal Chemists wrote "Rice bran is generally under-utilized in the author's opinion, in view of the quantity and quality of materials present" (page 285) and "Upgrading the use of bran or polish to more valuable purposes may be a complex problem".

The major problem which exists is the action of lipases on glycerides present in the bran which hydrolyze them to free fatty acids. These tend to be oxidized rapidly (in a few days) and thus cause rancidity in the product.

Furthermore, the techniques carried out hitherto have tended to result in only low yields of oil. The need for rapid separation of oil from the bran has prevented the establishment of economical large scale extraction facilities because of delays resulting from transport and storage.

Since bran has a potential for producing high grade edible oil (10-18% of its weight) and protein (10-15% of its weight), the inability to use bran for human nutritional purposes represents a substantial waste of resources. Indeed, it has been estimated that the world rice bran production can provide annually around 5 million tons of edible oil, 4 million tons of protein, 75,000 billion calories, plus vitamins and minerals. It was estimated that in Taiwan alone, the full utilization of rice bran could provide 30% of the total edible oil for local consumption.

Most rice is milled close to the growing areas in small capacity rice mills so as to remove the bran and its attendent lipases as soon as possible. Extraction of oil from bran when done at all is also carried out locally for the same reason. Some recovery of oil from rice bran is effected in Brazil, Burma, Chile, India, Japan, Taiwan and the United States. Normally this is done either by mechanical means using hydraulic presses or conventional oil expellers or by solvent extraction of the oil from finely powdered bran, usually employing hexane as solvent. Sometimes a partial preboiling of the bran has been carried out to try to meet the hydrolysis problem. However, such techniques do not enable anything like complete recovery of oil nor do they permit the establishment of any large scale oil extraction plant such as would enable the nutritional potential of rice bran to be fully realized.

A process of treating rice bran and rice polish to retard fatty acid development in the oils present to permit storage of the rice bran and polish for a longer period of time is disclosed in Burns and Cassidy U.S. Pat. No. 2,563,798 (1951).

This process involves subjecting the rice bran and rice polish to a minimum temperature of 212° F. (100° C.) within a relatively short time interval after the bran and polish have been removed from the rice grain In this way, the fatty acid development of the oils is effectively retarded. The heat can be applied in the form of live steam or radiant heat.

A process for extracting rice bran oil from rice bran is disclosed in Gastrock et al. U.S. Pat. No. 2,727,914 (1955). This process involves mildly cooking the rice at an initial temperature from about 170° to 210° F. (77° to 99° C.) to a final temperature of less than about 235° F. (113° C.), crisping the cooked particles by exposing them to a relatively cool atmosphere and lowering the temperature to below about 130° F. (54° C.). The rice bran particles are then mixed with a solvent (e.g. hexane) for the rice bran oil and the resulting slurry is subjected to filtration.

Loeb, Morris and Dollear in J. Am. Oil Chemists, Soc. 26, 738-43 (1949) discussed the possibility of inhibiting the action of lipase on glycerides in rice bran by storage at different temperatures, in different humidities and after drying. They also studied the use of chemical inhibitors and the use of inert atmospheres for storage. They concluded that the best inhibition was attained by keeping stored rice bran dry in a low humidity atmosphere.

Kopeikovskii et al in Izv. Vyssh. Ucheb. Zaved. Pishch. Tekhnol 1971 (4) 50-52, abstracted in Chemical Abstracts 76 page 242, Abstract 2615x concluded that the best treatment for inhibiting enzyme activity was to moisturize the bran to 19-21% and then to dry it at 105°-108° C.

Another attempt to meet the problem is found in the X-M process developed by Rivara Foods Inc. of Houston, Texas which involves simultaneous milling and solvent extraction. Although the yields of oil obtained by this method are said to be higher than those resulting from a separate solvent extraction operation after milling, the need for special milling equipment inhibits its use.

It is an object of the present invention to provide a process for obtaining cereal bran oil from cereal bran in good yield and which when used for extraction of rice bran oil is adaptable to the needs of rice-growing regions.

I have found that good yields of cereal bran oil and, in particular, rice bran oil can be recovered if prior to subjecting the bran to a solvent extraction process, the bran is first subjected to a high temperature high pressure treatment such as that provided by typical extruders used in the food processing industry.

Accordingly, from one aspect the present invention provides a process for recovery of edible oil from cereal products such as bran which comprises effecting solvent extraction of cereal products which has been subjected simultaneously to a temperature of 100°-200° C. and a pressure of at least 500 pounds per square inch, with a vegetable oil solvent to extract the cereal bran oil into the solvent and subsequently separating the miscella so formed from the bran.

From another aspect the present invention provides a process for stabilizing the oil content of cereal materials, particularly brans such as rice bran, by subjecting said material simultaneously to a temperature in the range 100°-200° C. and a pressure of at least 500 p.s.i. for from 5 to 30 second.

Typical vegetable oil solvents are liquid hydrocarbons such as hexane and alcohols such as ethyl and isopropyl alcohols. n-Hexane is normally preferred.

The high temperature, high pressure treatment of the bran induces shearing of the material and results in compaction and coalescence of the bran as a result of protein alignment and agglomeration.

For ease of effecting the solvent extraction operation, the product obtained from the high temperature high pressure treatment is most useful in pellet form. Production of such pellets by high temperature high pressure treatment can be effected by the use of pelletizer/extruders routinely used in the food processing industry. For example, Brabender, Anderson and Wenger extruders may be employed. Normally the pressures employed will be in the range 850 to 3,500 p.s.i. The temperature range employed is most conveniently in the range 100° to 150° C. Typically the bran will be subjected to these conditions for from 5 to 30 seconds preferably 15 to 20 second.

Solvent extraction of the product obtained from the high temperature/high pressure treatment may be effected in any convenient manner. For example, solvent can simply be allowed to percolate through the compacted bran material in a batch process. Alternatively a continuous process wherein the compacted bran is carried through a trough of solvent, for example, with the bran being subjected also to vertical motion perpendicular to the direction of motion through the trough or a counter current extraction process such as that using the Hildebrandt apparatus may be used.

There is no reason why the high temperature high pressure compaction step need be effected on the same site as the solvent extraction. In many parts of the world it may be more convenient to carry out the high temperature high pressure treatment in conjunction with milling on a site on a local basis close to the cereal growing fields and then to transport the compacted stabilized bran to a central operation for effecting solvent extraction.

The high temperature high pressure treatment has the effect of stabilizing rice bran against rancidity-inducing degradation. It is conjectured that this may be a result of deactivation of the degradative enzymes.

The oil is obtained from the solvent extraction step in the form of a miscella. From this the solvent can be stripped in any convenient way, for example, by distillation.

The oil obtained if desired be subjected to further purification or refining. For example, it may be bleached with bleaching clays such as Fullers earth or with activated charcoal. Furthermore, if necessary, non-glyceride fatty materials may be removed by washing with alkaline solutions.

The process of the invention will now be illustrated by the following Examples:

EXAMPLE I

Rice bran having a moisture content of 11.2% was introduced into a Brabender ¾" laboratory extruder (available from CCW Brabender Instruments Inc. 50 East Wesley Street, South Hakensack, New Jersey, 07606) operating at a temperature of 130° C. The bran was retained for a residence time of 15 seconds and extruded through a die of internal diameter 0.32 mm at an auger speed of 150 r.p.m.

The product obtained was divided into lots subjected to solvent extraction using hexane after storage for differing periods.

The solvent extract was in each case analyzed to determine the amount of oil extracted. The results were as follows (the amount of oil being given on a weight percentage basis based on the weight of bran used):

| Storage Period | Oil Obtained |
|---|---|
| 0 days | 17.5% |
| 7 days | 16.3% |
| 15 days | 15.7% |
| 30 days | 16.5% |

A comparison experiment was carried out investigating the extraction of oil under the same conditions but using rice bran which had not been subjected to extrusion. The results obtained were as follows:

| Storage Period | Oil Obtained |
|---|---|
| 0 days | 11.8% |
| 7 days | 11.8% |
| 15 days | 11.3% |
| 30 days | 12.2% |

It is evident from this data that the yield of oil is substantially increased by the pre-treatment by extrusion. The oils obtained by these extractions were analyzed for free fatty acid content which would indicate the degree of degradation which had occurred during storage.

| | Free Fatty Acid Content | |
|---|---|---|
| Days of Storage | Bran stored without extrusion | Extruded "Bran" |
| 0 days | 4.95% | 3.58% |
| 7 days | 17.45% | 4.91% |
| 15 days | 24.20% | 5.56% |
| 30 days | 33.23% | 6.46% |

The product of the extrusion was also compared with unextruded bran to investigate the rate at which the solvent percolated through the material.

| | Rate of Liquid Passage (ml/min) | |
|---|---|---|
| No. of Days For Which Material Stored | Bran stored without extrusion | Extruded "Bran" |
| 0 | 15.8 | 26.0 |
| 7 | 12.7 | 24.4 |
| 15 | 16.2 | 32.2 |
| 30 | 13.4 | 30.1 |

I claim:

1. A process for the recovery of edible oil from rice bran which comprises 1) subjecting said rice bran simultaneously to a temperature in the range 100°-200° C. and a pressure of at least 500 psi from 5 to 20 seconds in the absence of added moisture so as to produce a pelletized product and 2) subjecting said pelletized product to solvent extraction and separating the miscella formed from the bran.

2. A process according to claim 1, wherein said solvent extraction is effected using hexane as solvent.

3. A process according to claim 1, wherein the material subjected to solvent extraction had been obtained by heating rice bran at from 100°–150° C., at a pressure of 850–3,500 pounds per square inch for from 5 to 20 seconds.

4. A process according to claim 3, wherein the material subjected to solvent extraction had been obtained by heating rice bran at from 100° to 150° C. at a pressure of 850–3,500 pounds per square inch for from 15 to 20 seconds.

5. A process according to claim 4, wherein the solvent employed for solvent extraction is hexane.

6. A process for stabilizing the oil content of rice bran which comprises subjecting said material to a temperature in the range 100°–200° C. and a pressure of at least 500 psi from 5 to 20 seconds in the absence of added moisture so as to produce a pelletized product.

7. A process according to claim 6, wherein said treatment is at from 100° to 150° C. and at a pressure of 850–3,500 p.s.i.

8. A process according to claim 6, wherein said treatment is maintained for from 15 to 20 seconds.

* * * * *